INVENTORS
ANTHONY JOHN LEOPARD
BY
ATTORNEYS

United States Patent Office 3,565,498
Patented Feb. 23, 1971

3,565,498
THRUST BEARINGS
Anthony John Leopard, Chalfont St. Peter, and Mateusz Kazimierz Bielec, London, England, assignors to The Glacier Metal Company Limited, Alperton, Wembley, Middlesex, England
Filed Oct. 15, 1968, Ser. No. 767,721
Claims priority, application Great Britain, Oct. 16, 1967, 47,064/67
Int. Cl. F16c *17/06*
U.S. Cl. 308—73                                    6 Claims

ABSTRACT OF THE DISCLOSURE

The invention is a simplified thrust or journal pad bearing, in which the pads are interconnected by members in a complete ring unit separable from the pad support surface so that the ring unit can be simply mounted against a supporting surface without having to mount each pad individually. The interconnecting members are preferably flexible.

---

This invention relates to pad bearings whose bearing surface is defined by the surfaces of a number of bearing pads. The bearing surface may co-operate with a surface of a collar on a rotating shaft whose axial thrust is to be taken by the bearing or perhaps the bearing may take the form of a journal bearing co-operating with an associated cylindrical or part cylindrical surface.

In the past some thrust or journal bearings have been composed of a number of circumferentially arranged pads each mounted to be capable of tilting on a carrier ring and while such bearings have given satisfactory performance they are difficult to make and expensive, and it is an object of the present invention to provide a multi-pad bearing with a comparable performance to a tilting pad bearing but one which will be considerably simpler and cheaper.

According to the present invention, in a pad bearing whose bearing surface is defined by the surfaces of a number of bearing pads, interconnecting members locate the pads in relation to one another in a ring unit of circumferentially arranged bearing pads. Preferably the interconnecting members are flexible.

Thus the bearing pads are in a unitary construction possibly by assembly of the pads with the interconnecting members or possibly being integral with them, by casting the ring unit or by machining from a continuous uniform-section ring to leave between adjacent pads only a flexible interconnecting member of relatively small cross-section. Then the ring unit can be simply mounted against a supporting surface and there is not the need to mount each pad individually against a carrier in order to ensure proper spacing and location.

In a preferred form of the invention each pad has a supporting surface opposite the bearing surface which is circumferentially narrower than the width of the pad for example being about a quarter, a third, or one half, of the width of the pad. With such an arrangement there will be sides of the pad overhanging the supporting part in the manner of cantilevers to be capable of deflection instead of having to have a complicated support permitting tilting of the whole pad in relation to a carrier ring.

Deflection of the cantilever parts can be due to stresses applied through liquid lubricant between the co-operating bearing surfaces or could be due to thermal distortion or both. Shearing losses in the lubricant between the co-operating bearing surfaces generate heat which will heat the bearing side of the pads and a temperature differential can be established across the pad thickness which can be increased by providing appropriate cooling for the opposite surface. Appropriate design of the pad can cause such temperature differential in conjunction with deflections due to load to deform the pads to give the desired profile or surface without having to provide a tilting mounting.

The pads may carry a plastic, white metal, or other appropriate, bearing lining.

The plastic coating may be formed from a combination of epoxide and melamine-formaldehyde resins which may incorporate fillers, for example graphite and a polytetrafluoroethylene compound. Preferably the plastic coating is in the form of an epoxy resin with bronze, P.T.F.E. and graphite inclusions. This type of coating is particularly useful for water lubricated applications. One way of applying the coating is by spraying from a solution and heating and drying the coating. In order to provide the required thickness of coating, which may be of the order of .010", several coatings of plastic may be required, each coating being heated before the next coating is applied until the required thickness of coating is achieved.

The invention will now be described by way of example with reference to the accompanying diagrammatic drawings in which.

Figure 1:
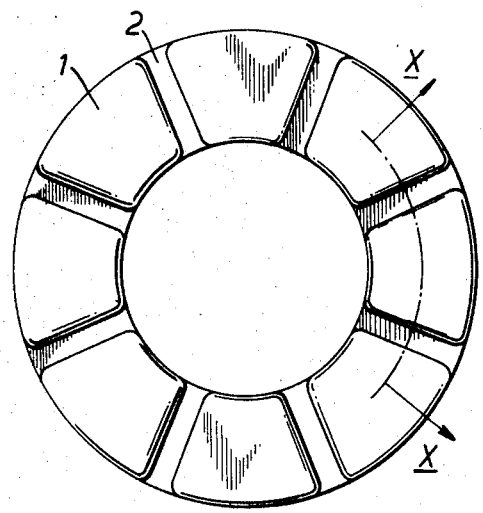
FIG. 1 shows a plan view of a thrust bearing embodying the invention.
Figure 2:
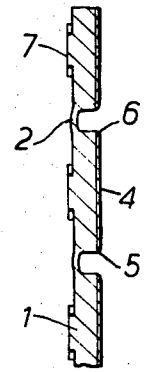
FIG. 2 shows a circumferential section taken on the lines XX in FIG. 1.
Figure 3:
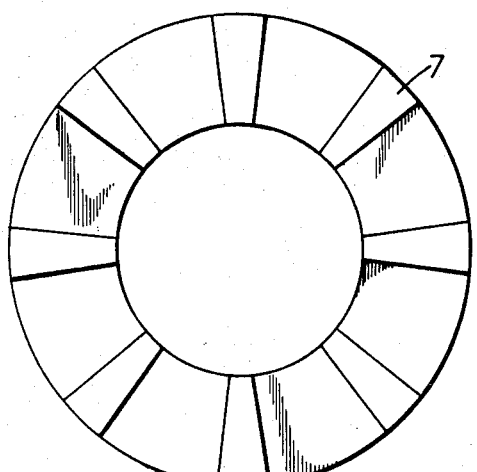
FIG. 3 shows an underneath view of a thrust bearing embodying the invention.

FIGS. 1 to 4 show a ring of thrust pads 1, generally of segmental shape, are shown integrally interconnected by relatively thin necks 2 of the full radial depth of the pads. The bearing surface of the pads 1 is coated with a plastic or bearing metal layer 4 having a thickness of about 0.01 inch and the circumferential and radial edges of the pads are chamfered as indicated by the chamfers 5 and 6. Each pad 1 has a ridged supporting part 7, the width of which is conveniently one-third of the width of a pad, and the depth of which is the radial depth of the pad. The supporting parts 7, as shown more clearly in FIG. 3, do not have parallel edges and decrease in width towards the inner circumference of the thrust ring.

Figure 4:
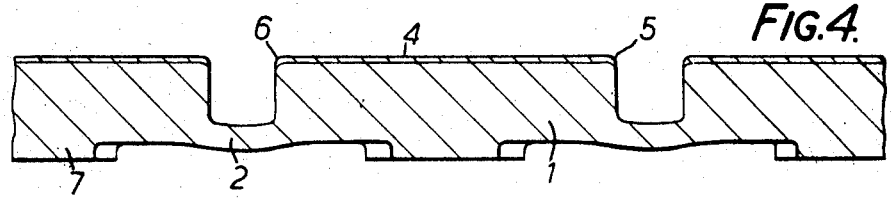
FIG. 4 shows in section to an increased scale, a pad for a thrust bearing in its operating or distorted condition.

In operation the thrust ring is assumed to be used in association with a thrust collar. With a plastic coating the thrust ring is suitable for use when lubricated with water; on the other hand, the bearing can be used with a white metal bearing surface and lubricated with oil. During operation of the trust ring the temperature of the lubricant and the temperature of the bearing surface of the pads will rise due to shearing losses in the lubricant, and cool water is supplied to the back of the pads thereby creating a temperature differential across the thickness of a pad. The temperature differential causes the pads 1 to distort in the manner of a crown as indicated in FIG. 4. In addition to thermal distortion a distortion will occur due to the load on the bearing. In the case of water lubricated bearings the load distortions are dominant whereas in the case of oil lubricated bearings the thermal distortions are likely to be dominant depending upon the operating conditions. In addition to these distortions the thrust forces will cause the pad to distort about its support 7 and the pad, and in particular the bearing surface, will assume a shape which, in co-operation with the associated thrust collar, will assist the formation of an hydrodynamic lubricant film. A wedge of lubricant will be built up between the thrust collar and the pads due to the effect of the thermal distortion assisted by the thrust distortion.

These bearings are suitable for directed lubrication in order to reduce losses at high speeds. A number of holes could be drilled in the thinner connecting sections 2 between the pads which could be connected to a pressurized supply of lubricant.

The ring of the thrust pads may be made from bronze, stainless steel (for water lubricant) or mild steel (for oil with a white metal lining) for example, and the thinner connecting lands may be produced by machining slots across the radial depth of the annulus. Alternatively, the thrust rings according to the invention may be stamped out from sheet material.

The lining 4 may be a layer of a plastic material which may take the form of an epoxy resin with bronze P.T.F.E. and graphite inclusions. This layer may be sprayed onto the surfaces by electrostatic means and cured at, say, 200° C. for half an hour. The layer may conveniently be an epoxy resin containing P.T.F.E. or bronze in order to avoid the necessity of having four components. The surface of the pads may be sand blasted to provide a key and the plastic layer sprayed on to a thickness of about 0.01 inch. The layer can then be machined to the required tolerances.

The ratio of pad support width to pad width is an important one; if the support is too narrow then the distortion or crowning of the pad will be too large, thus providing a small area of bearing surface to withstand the applied loads. If the pad support width is too wide relative to the pad width there may be insufficient crowning or distortion to produce the necessary hydrodynamic lubricant film between the pad bearing layer and the collar.

Figure 5:
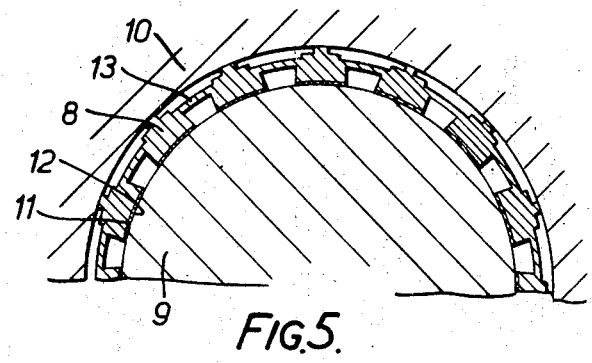
FIG. 5 is a partial cross-sectional view of a journal bearing embodying the invention.
Figure 6:
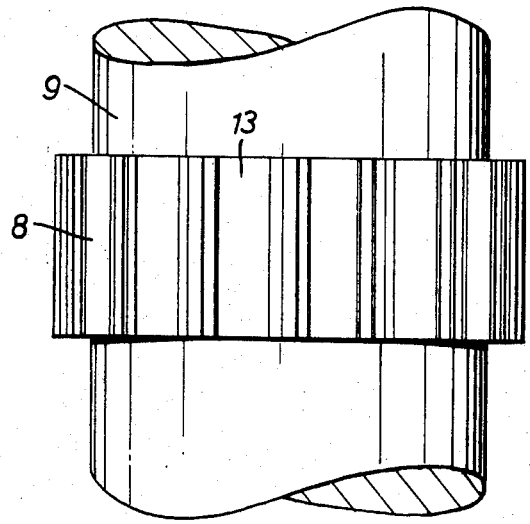
FIG. 6 is a perspective view of the journal bearing of FIG. 5.

FIGS. 5 and 6 show the invention applied to a journal bearing having a diameter in the region of sixteen inches. A ring of bearing pads 8 is arranged around a journal member 9 which is arranged to rotate within a supporting member 10. The bearing surfaces 11 of the pads are coated with a layer of material 12 as described in relation to the thrust bearings. Each pad 8 is located in relation to the adjacent pad by a member 13. The ring of pads may be constructed in the same way as described in relation to thrust bearings or the ring may be made by providing slots in the bush of the bush of a conventional journal bearing, for example by milling.

What we claim as our invention and desire to secure by Letters Patent is:

1. A pad bearing comprising bearing pads, each having opposed sides and opposed edges, relatively thin flexible interconnecting necks between corresponding sides of adjacent pads, and a supporting part behind each of the bearing pads extending over the full breadth of the pad from edge to edge, but only over a minor part of the circumferential width of the pad from side to side, for supporting the pad without tilting, while allowing distortion of the part of the pad circumferentially beyond the supporting part, said bearing pads and interconnecting necks comprising an integral ring unit, the bearing surfaces of the pads being above the necks by more than half the pad thickness and being connected with the necks by steeply-rising walls defining oil spaces between adjacent pads, the area of the bearing surface defined by the bearing pads being a major part of the total ring surface area.

2. A pad bearing according to claim 1 in which all the components are integrally formed from a continuous ring.

3. A pad bearing according to claim 1 in which the steeply rising walls defining the oil spaces are parallel.

4. A pad bearing according to claim 1 in which the width of the supporting parts are one third of the circumferential width of the bearing pads.

5. A pad bearing according to claim 1 in which each bearing pad carries a bearing lining.

6. A pad bearing according to claim 2 in which the continuous ring is a casting.

References Cited

UNITED STATES PATENTS

| 1,457,086 | 5/1923 | Newhouse | 308—160 |
| 1,684,693 | 9/1928 | Bohm | 308—160 |
| 2,306,048 | 12/1942 | Fast | 308—160 |
| 2,758,892 | 8/1956 | Wallgren | 308—73 |
| 3,243,242 | 3/1966 | Hennessey | 308—160 |

FOREIGN PATENTS

| 75,896 | 3/1918 | Switzerland | 308—160 |

FRED C. MATTERN, Jr., Primary Examiner

U.S. Cl. X.R.

308—160